March 21, 1944.  J. C. MONAHAN  2,344,628
GEAR PUMP
Filed Dec. 26, 1940

INVENTOR
John C. Monahan.
BY
Harness, Dickey & Pierce.
ATTORNEYS.

Patented Mar. 21, 1944

2,344,628

UNITED STATES PATENT OFFICE 2,344,628

GEAR PUMP

John C. Monahan, Royal Oak, Mich., assignor to Gar Wood Industries, Inc., Detroit, Mich., a corporation of Michigan Application December 26, 1940, Serial No. 371,712

4 Claims. (Cl. 103—126)

The present invention is a continuation-in-part of copending application of John C. Monahan, Serial No. 340,166, filed June 12, 1940, and relates to improvements in Fluid motor or gear pump construction. The invention is particularly adapted for use in fluid motors, and is so illustrated, but it is also beneficial and useful in gear pump constructions.

One of the primary objects of the present invention is to provide an improved fluid motor or pump construction of the type mentioned, in which relief is provided in the gears, thereby eliminating the necessity for providing relief in the wear plates, so that thinner wear plates and both sides of such wear plates may be used.

A further object of the invention is to provide an improved construction, so that relief is provided which is not affected by misalignment of wear plates, such as is found in prior constructions where the relief is provided by passageways through the wear plates.

A further object is to provide a means for relieving trapped oil on the output side of the gears and a means for smooth and gradual filling of the tooth cavities on the intake side of the gears.

A further object of the invention is to provide an improved means in a fluid motor which eliminates any sudden opening of the tooth cavities and prevents the sudden inrush of oil to the cavities, thereby eliminating shocks and pulsations in the oil lines.

A further object of the invention is to provide a means in a fluid motor for eliminating dwell or a break in the flow which takes place while oil fills up the suddenly opened tooth cavity in which a partial vacuum has been formed.

A further object is to provide a means in a fluid motor so that the fluid motor will operate smoothly at slow speeds.

Other objects of the invention will become apparent from the following specification, the drawing relating thereto, and from the claims hereinafter set forth.

In the drawing, in which like numerals are used to designate like parts in the several views throughout:

Figures 1, 2:
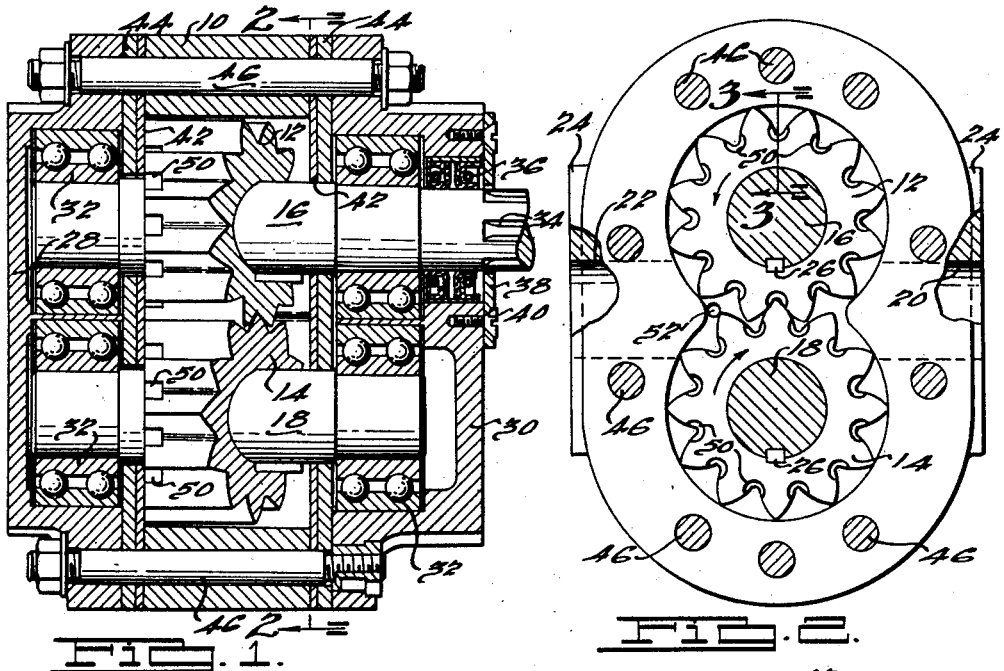
Figure 1 is a vertical, cross-sectional view of a fluid motor embodying features of the present invention, with parts in elevation and with sections taken through the gears on a plane at an angle to the main plane of the view.
Fig. 2 is a view taken along the line 2—2 of Fig. 1.
Figure 3:
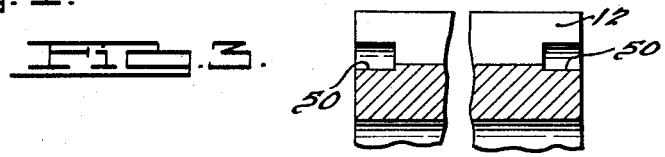
Fig. 3 is an enlarged, broken, cross-sectional view taken substantially along the line 3—3 of Fig. 2.

Referring to the drawing, a fluid motor is illustrated which includes a housing formed by a spacer section 10 which has a peculiar configuration adapted to receive and closely house gears 12 and 14. Such gears 12 and 14 are keyed to shafts 16 and 18, respectively, and are arranged in intermeshing engagement so that as oil under pressure from a suitable source enters through inlet port 20, the gears are rotated in the direction shown by the arrows and the oil is discharged through outlet port 22, as is conventional in fluid motors of this generic type. The ports 20 and 22 are formed in the section 10 and have flanges 24 formed therearound, such flanges being adapted to mate and be mounted on cooperating conduit members (not shown).

The gears 12 and 14 are keyed to their respective shafts by means of conventional keys 26. One of such shafts is the driving shaft and the other an idle shaft; and, in the embodiment illustrated. the shaft 16 is the driving shaft while shaft 18 is an idler shaft.

A rear cover 28 is disposed on one side of the spacer section 10; and the front cover 30 is disposed on the other side of the spacer section 10. Ball bearing assemblies 32 are mounted within the covers 28 and 30 for rotatably mounting shafts 16 and 18 therein. The shaft 16 extends through an aperture in the front cover 30 and projects therebeyond. The projecting portion is splined, as indicated at 34, for attachment to suitable means for transmitting the driving torque to the means to be driven. An oil seat unit 36, of suitable construction, is disposed within the cover 30 by means of screws 40 or the like for retaining the seal 36 in position.

The gears 12 and 14 are of the same width as the width of spacer section 10; and wear plates 42 are disposed at opposite ends of the gears 12 and 14, with the inner surfaces of such wear plates in bearing relationship with the ends of the gears. Such wear plates are, of course, provided with openings therethrough through which shafts 16 and 18 extend with close running fits therebetween. Steel backing plates 44, of greater thickness than the thickness of the relatively thin wear plates 42, are provided with aligned apertures therethrough and are disposed on the outside of the wear plates 42 and between such wear plates and the inner faces of the covers 28 and 30. Such steel backing plates serve to keep the oil pressure within the motor housing from buckling the relatively thin wear plates 42.

The section 10, covers 28 and 30, wear plates 42, and backing plates 44, are all secured together by means of a plurality of spaced bolts 46, which are passed therethrough and are tightly drawn together by nuts on the ends of the bolts.

In order to provide the pressure relief, according to the present invention, portions of each of the teeth are removed at the roots thereof and at both ends of all of the teeth. Such removed portions are indicated at 50 and are formed from the sides of the teeth inwardly thereof a predetermined desired distance. The removed portions may be formed by a simple drilling or boring operation so that the present invention provides a practical and simplified manufacturing manner of providing the relief and one which is well adapted to quantity production.

Figure 4:
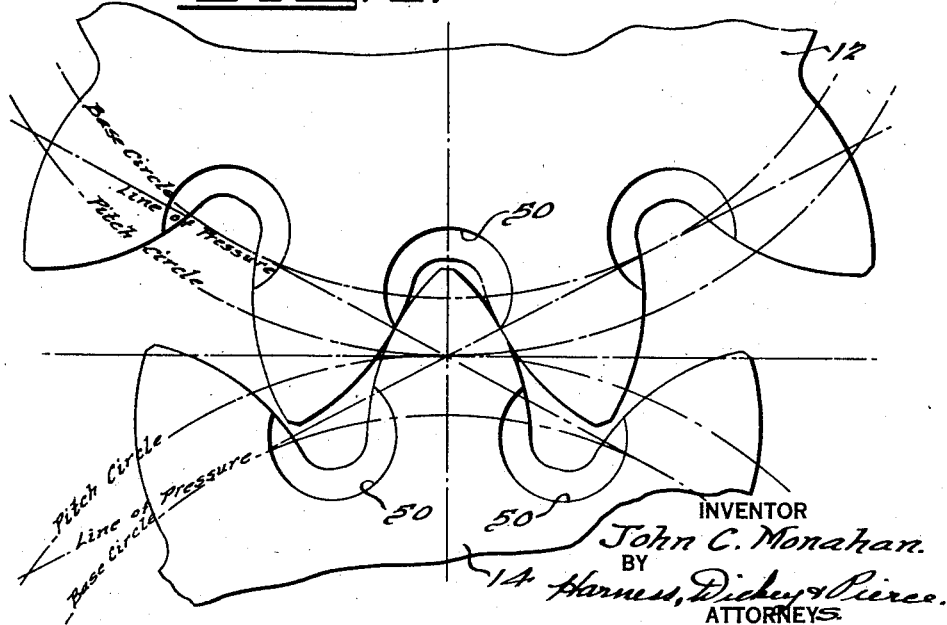
Fig. 4 is an enlarged, partial, diagrammatic view of the gears shown in Fig. 2, illustrating the manner in which the relief is provided.

The pressure relief pockets 50 are preferably of a partial circle in cross-section and their form and relationship is best illustrated in Fig. 4. The pitch and base circles and the lines of pressure of the intermeshing gears are there illustrated with one of the gear teeth on dead center position. The relief pockets 50 are so located that oil can escape from the pockets at any position except dead center. The relief pockets extend from the point of intersection of the line of pressure with the flanks of the teeth, around the bottom of the teeth openings.

Small bleed openings 52 are provided through the wear and backing plates on the low pressure side of the pump or motor and outside the path of the gears.

In the operation of the structure above described, it will be seen that as the oil under pressure enters through inlet 20 the intermeshing gears 12 and 14 are driven in the direction indicated by the arrows and the oil is discharged through outlet 22. The relief pockets 50 provide relief for trapped oil on the output side and there may be a gradual rather than a sudden filling of the tooth cavity on the intake side of the motor or pump, thereby eliminating aeration or foaming of the oil.

Also, since the relief is provided in the gears rather than in the wear plates, both sides of such plates may be used. In other words, when one side of the wear plate is worn, the wear plates may be reversed in position so that both sides may be used.

Formal changes may be made in the specific embodiment of the invention described without departing from the spirit and substance of the invention, the scope of which is commensurate with the appended claims.

What is claimed is:

1. In a fluid motor or gear pump construction, housing means, means providing inlet and discharge ports, intermeshing gears disposed within said housing means, shafts disposed within said housing means and fixed to said gears, wear plates bearing against the axial ends of said gears, portions at the ends only of said gears being removed adjacent the roots of the teeth thereof to provide pressure relief means, each of said removed portions beginning at the point of intersection of one of the lines of pressure with the flank of one of the teeth and extending around the bottom of the tooth opening and terminating at the point of intersection of the other line of pressure of the adjacent tooth.

2. In a fluid motor or gear pump construction, housing means, means providing inlet and discharge ports, intermeshing gears disposed within said housing means, shafts disposed within said housing means and fixed to said gears, wear plates bearing against the axial ends of said gears, portions at the ends only of said gears being removed adjacent the roots of the teeth thereof to provide pressure relief means, each of said removed portions beginning at the point of intersection of one of the lines of pressure with the flank of one of the teeth and extending around the bottom of the tooth opening and terminating at the point of intersection of the other line of pressure of the adjacent tooth.

3. In a gear adapted for use in a fluid motor or gear pump construction, means providing relief in said gear, said means comprising removed portions at the ends only of said gear adjacent the roots of the teeth, each of said removed portions beginning at the point of intersection of one of the lines of pressure with the flank of one of the teeth and extending around the bottom of the tooth opening and terminating at the point of intersection of the other line of pressure of the adjacent tooth.

4. In a gear adapted for use in a fluid motor or gear pump construction, means providing relief in said gear, said means comprising removed portions at the ends only of said gear adjacent the roots of the teeth, each of said removed portions beginning at the point of intersection of one of the lines of pressure with the flank of one of the teeth and extending around the bottom of the tooth opening and terminating at the point of intersection of the other line of pressure of the adjacent tooth.

JOHN C. MONAHAN.